US007088840B2

(12) United States Patent
Maekawa

(10) Patent No.: US 7,088,840 B2
(45) Date of Patent: Aug. 8, 2006

(54) LISTENING DEVICE FOR HANDS-FREE SYSTEM

(75) Inventor: Koji Maekawa, Yamagata-ken (JP)

(73) Assignees: Pioneer Corporation, Tokyo (JP); Tohoku Pioneer Corporation, Yamagata-ken (JP)

( * ) Notice: Subject to any disclaimer, the term of this patent is extended or adjusted under 35 U.S.C. 154(b) by 32 days.

(21) Appl. No.: 10/714,628

(22) Filed: Nov. 18, 2003

(65) Prior Publication Data

US 2004/0101154 A1 May 27, 2004

(30) Foreign Application Priority Data

Nov. 21, 2002 (JP) ............................ 2002-337411

(51) Int. Cl.
*H04R 25/00* (2006.01)
*H04R 1/02* (2006.01)
*H04B 1/00* (2006.01)

(52) U.S. Cl. ........................ 381/380; 381/389; 381/86

(58) Field of Classification Search .................. 381/86, 381/87, 151, 162, 312, 322, 326, 361, 367, 381/376, 380, 385, 389

See application file for complete search history.

(56) References Cited

U.S. PATENT DOCUMENTS 4,150,262 A * 4/1979 Ono .......................... 381/326
4,654,883 A * 3/1987 Iwata ......................... 381/380
6,456,721 B1 * 9/2002 Fukuda ....................... 381/380

FOREIGN PATENT DOCUMENTS

| | | | |
|---|---|---|---|
| JP | H2-86359 | * | 7/1990 |
| JP | 10-234713 | * | 9/1998 |
| JP | 2001-056693 | | 2/2001 |
| JP | 2002-191469 | | 7/2002 |

* cited by examiner

*Primary Examiner*—Sinh Tran
*Assistant Examiner*—Brian Ensey
(74) *Attorney, Agent, or Firm*—Arent Fox PLLC

(57) ABSTRACT

A listening device for a hands-free system includes a bone conduction actuator and a holder for holding the actuator. The holder includes a first contact part for contacting the actuator to a body part, a second contact part protruded at a spaced apart location from the first contact part, and a pivot part between the first and second contact parts. The holder is supported such as to be rotatable around a shaft in the pivot part orthogonally to a plane containing the contact parts and the pivot part. Thus, provided is a listening device which uses a bone conduction actuator having a contact part which can be contacted to a surface of a human body with a constant and appropriate pressure so as to achieve a constant level of signal transmission irrespective of the differences in the shape of the body part or the movements of the user.

5 Claims, 3 Drawing Sheets

LISTENING DEVICE FOR HANDS-FREE SYSTEM

BACKGROUND OF THE INVENTION

The present invention relates to a listening device for a hands-free system.

The present application claims priority from Japanese Patent Application No. 2002-337411, the disclosure of which is incorporated herein by reference.

Hands-free kits for mobile communication terminals such as mobile phones and PHSs are generally known. FIG. 1 shows one example of an in-vehicle hands-free system: When the communication terminal (a) receives a call, its adaptor (b) automatically connects the call after one to three rings. The user speaks with the caller through a microphone (c). After the caller has hung up, the adaptor automatically cuts the call.

With this system, the voice from the adaptor's built-in speaker (d) can be heard throughout the vehicle. Some other hands-free kits use a single earphone instead of the speaker (d), which may, however, be problematic for in-vehicle applications, because the driver cannot hear ambient sounds well with one ear plugged. To resolve this problem, there has been developed a listening device using a bone conduction actuator which transmits voice signals through a human bone. For example, Japanese Patent Application Laid-Open No. 2001-56693 shows a listening device having an actuator built in a seat headrest. Japanese Patent Application Laid-Open No. 2002-191469 shows a listening device actuator built in a seat back or a seat cushion.

These conventional listening devices using a bone conduction actuator (hereinafter, simply called as "actuator") have the following problems:

The actuator needs to be pressed against a surface of a human body with constant and appropriate pressure so as to achieve favorable signal transmission through the bone. However, because the actuator is fixed in part of the seat in the above prior art, the pressure changes depending on the posture of the user on the seat or head movements, the actuator outputs cannot always be transmitted to the human bone in an optimal manner.

Also, part of the human body against which the actuator is to be pressed has various curved shapes depending on the users. Because the actuator is fixed in the above listening devices, it cannot always be brought in tight contact with the surface of the human body in various shapes. There occurs thus a difference in the level of signal transmission because the actuator is not contacted to the user's body part in a constant manner.

Moreover, it is very likely that the user moves his/her body or head frequently while driving or during the use of the listening device. Put differently, the user will feel uncomfortable if he/she cannot move his/her body or head freely during use. In this respect, the prior art actuators are uncomfortable to use because they are fixed and the user must fix his/her body or head so as to hear the caller's voice well.

SUMMARY OF THE INVENTION

An object of the present invention is to overcome these problems encountered by the prior art and to provide a listening device which is comfortable to use, i.e., a listening device which uses a bone conduction actuator having a contact part which can be contacted to a surface of a human body with a constant and appropriate pressure so as to achieve a constant level of signal transmission irrespective of the differences in the shape of the body part or the movements of the user. Another object of the present invention is to provide a listening device for a hands-free system, with which the caller's voice is not heard by anyone nearby and with which the user can hear ambient sounds.

In order to achieve the above-mentioned objects, a listening device according to the present invention has the following aspects.

According to a first aspect of the present invention, a listening device using an actuator for transmitting a voice signal through a human bone when contacting the actuator to a human body, includes a holder for holding the actuator, and the holder includes a first contact part for contacting the actuator to a human body part, a second contact part protruded at a spaced apart location from the first contact part, and a pivot part between the first contact part and the second contact part.

According to a second aspect of the present invention, a method of using a listening device having an actuator for transmitting a voice signal through a human bone when contacting the actuator to a human body, includes the steps of: contacting a holder for holding the actuator to a human body part at two points, one at a contact part of the actuator and the other at another contact part protruded at a spaced apart location from the contact part of the actuator; and rotating and supporting the holder around a shaft in a pivot part between the contact parts, the shaft being orthogonal to a plane containing the contact parts and the pivot part.

According to a third aspect of the present invention, a listening system using an actuator for transmitting a voice signal through a human bone when contacting the actuator to a human body, comprising: a holder including a first contact part for contacting the actuator to a human body part, a second contact part protruded at a spaced apart location from the first contact part, and a pivot part between the first contact part and the second contact part; an arm for supporting the holder such as to be rotatable around a shaft in the pivot part orthogonally to a plane containing the first and second contact parts and the pivot part; a support member for rotatably supporting the arm such as to be capable of retaining the arm at any desired location and retracting the arm from the human body part; and a resilient biasing member provided between the arm and the support member so that the holder is pressed against the human body part with a resilient bias applied through the arm.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Figure 1:
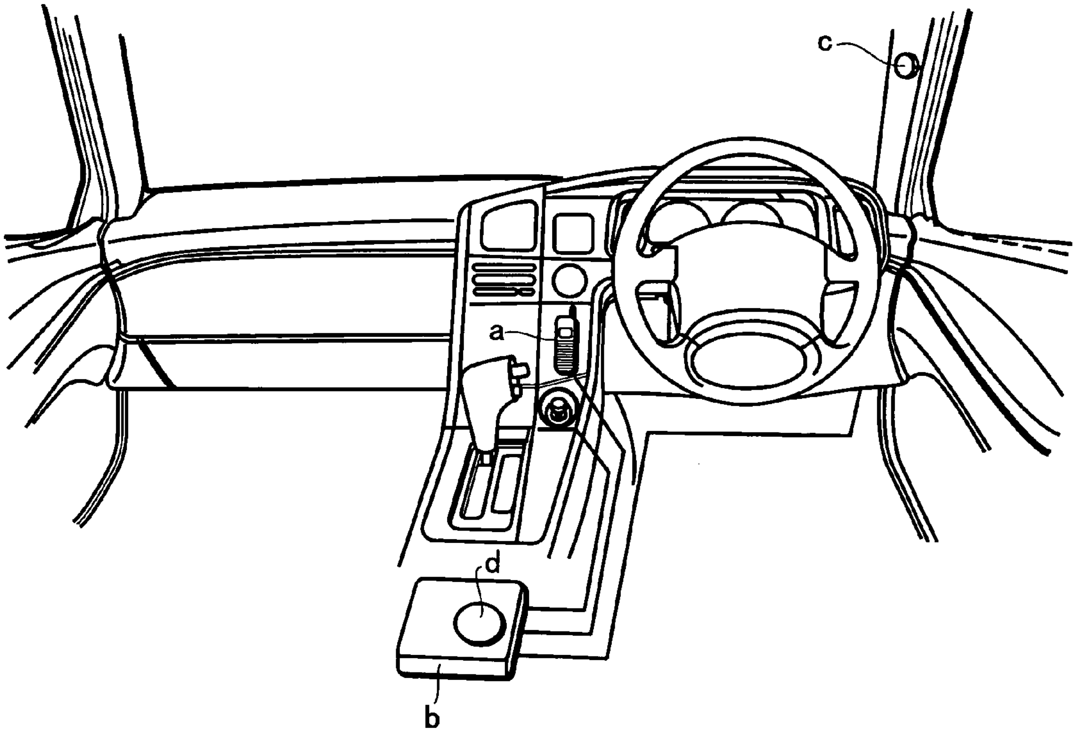
FIG.1 PRIOR ART
FIG. 1 is a schematic representation for explaining the structure of a conventional in-vehicle hands-free system.
Figure 2:
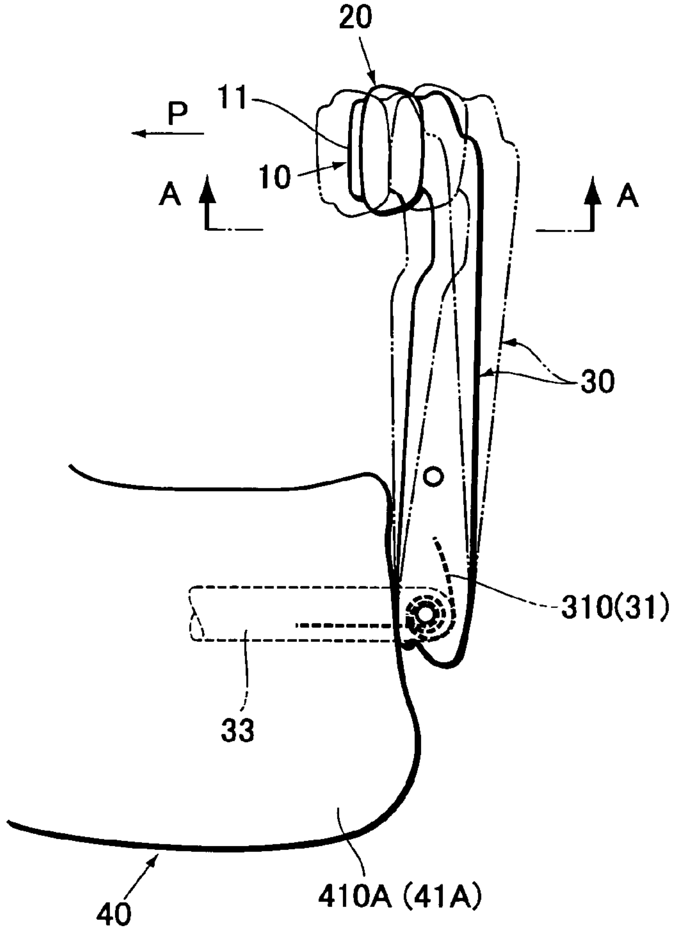
FIG. 2 is a plan view illustrating the external appearance of a listening device according to one embodiment of the present invention.
Figure 3:
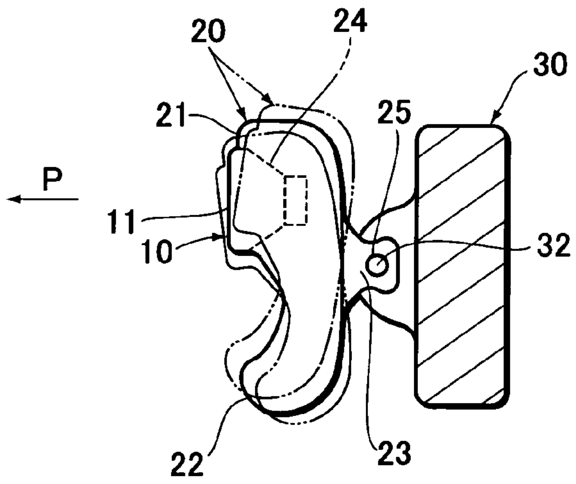
FIG. 3 is a cross section taken along the line A—A of FIG. 2.
Figure 4:
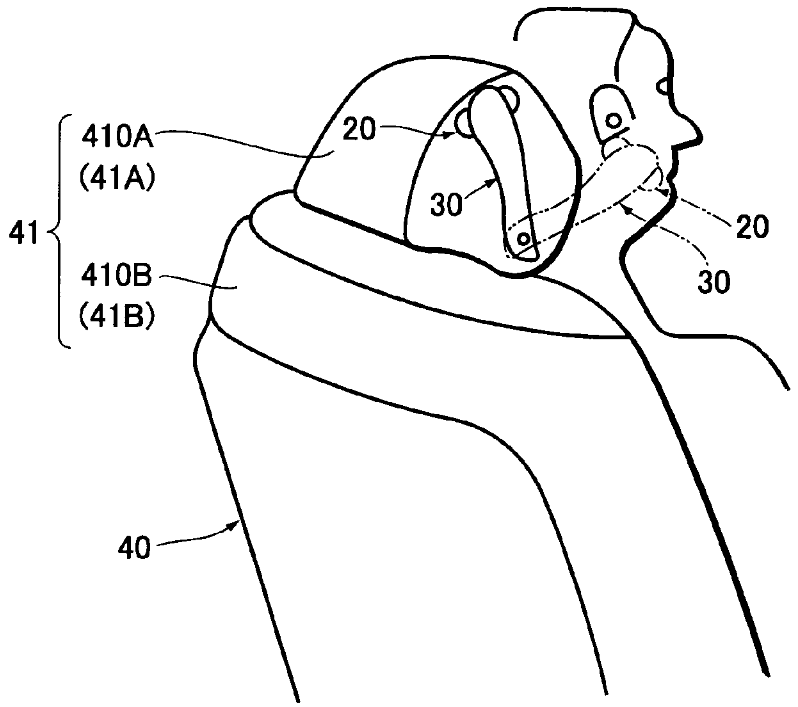
FIG. 4 is a perspective view for explaining how the listening device is used.
Figure 5:
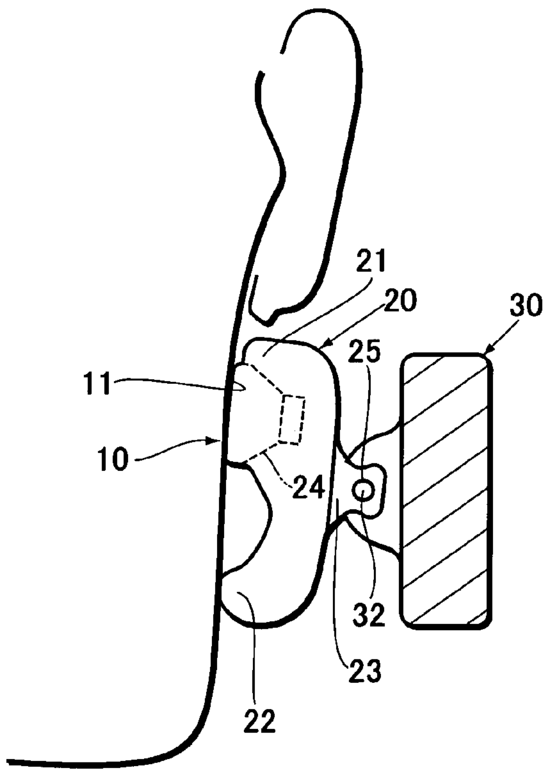
FIG. 5 illustrates how the listening device is contacted on part of a user's head.

Hereinafter, preferred embodiments of the present invention will be described with reference to the accompanying drawings. FIG. 2 is a top plan view illustrating the external appearance of a listening device according to one embodiment of the present invention. FIG. 3 is a cross section taken along the line A—A of FIG. 2. FIG. 4 is a perspective view for explaining how the listening device is used. FIG. 5 illustrates how the listening device is contacted on part of a user's head.

The listening device shown in the drawings employs an actuator 10 which transmits voice signals through a human bone when contacting the actuator to a human body, i.e., the actuator 10 converts voice signals into vibration signals, which is a prerequisite of the present invention.

In a first embodiment of the present invention, as a first feature, the listening device includes a holder 20 for holding an actuator 10. The holder 20 includes a first contact part 21 for contacting the actuator 10 to a human body part, a second contact part 22 protruded at a spaced apart location from the first contact part 21, and a pivot part 23 between the first and second contact parts 21, 22.

Further, as a second feature, the holder 20 is supported such as to be rotatable around a shaft in the pivot part 23 orthogonally to a plane containing the first and second contact parts 21, 22 and the pivot part 23.

As a third feature, the holder 20 is supported in the pivot part 23 at a distal end of an arm 30, and the arm 30 is supported at the other end thereof on a support member 41 such that the holder 20 is pressed against the human body part with a resilient bias applied through the arm 20.

According to the configurations having these features, the holder 20 holding the actuator 10 includes the first and second contact parts 21 and 22, and the pivot part 23. The holder 20 is supported at the distal end of the arm 30 on the support member 41 such as to be rotatable around a shaft orthogonally to a plane containing the first and second contact parts 21, 22 and the pivot part 23, and pressed against the human body part. This structure enables positioning of the holder 20 for the bone conduction of signals. When the holder 20 is contacted to the human body part, the first and second contact parts 21, 22 together cause the holder 20 to rotate as required so that a contact part 11 of the actuator 10 is pressed against the body part with a constant and appropriate pressure. The level of signal transmission is thus maintained constant irrespective of the differences in the shape of the body part.

As a fourth feature, the listening device may further include a resilient biasing member 31 in a supporting portion of the arm 30 and the support member 41.

As a fifth feature, the resilient bias is provided by a reaction force created in the arm 30.

Because of the configuration as above where the resilient biasing member 31 is provided in the supporting portion of the arm 30 and the support member 41, it can be achieved that when the holder 20 is pressed against the human body part, a reaction force is created in the arm 30, whereby the resilient bias is applied to the holder 20. The holder 20 is thereby pressed against the body part with a constant and appropriate pressure. The pressure required for the bone conduction is thus provided and the user need not apply any pressure to the actuator 10. The listening device is therefore comfortable to use.

As a sixth feature, the support member 41 of the listening device supports the other end of the arm 30 rotatably such as to be capable of retaining the arm 30 at any desired location and retracting the arm 30 from the human body part.

This structure enables the other end of the arm 30 on the support member 41 both to be held at a given location and to be moved away from the body part, which means that the arm 30 can move following the motion of the body or head of the user. The listening device is thus comfortable to use because the user can freely move his/her body or head during use, and also, this structure ensures that a constant pressure is applied due to the following movement of the arm 30, whereby the level of signal transmission is maintained stable. When not in use, the arm 30 is retracted from the body, so that it does not obstruct the user at getting on or off of the vehicle.

As a seventh feature, the holder 20 is detachably supported at the distal end of the arm 30.

Thus the holder 20 and arm 30 need not be formed in one-piece, whereby the production cost can be reduced. Also, the repair cost of broken or malfunctioning holder 20 is reduced because the holder 20 is detachable from the arm 30.

As an eighth feature, the support member 41 may be a support member provided to a part of a vehicle seat 40, as indicated by reference symbols 41A and 41B.

That is, the arm 30 is supported somewhere on the seat 40 by anyone of support members 41A and 41B. The user can feel comfortable because the holder 20 remains pressed against the head while he/she can move his/her head or body freely during the drive. Thus, the bone conduction using the actuator 10 enables the user to talk with the caller with his/her hands on the steering wheel. The caller's voice cannot be heard throughout the vehicle so that the privacy is kept, and because the user can hear the ambient sounds at the same time, the safety of the passengers is ensured even during the phone conversation.

As a ninth feature, the actuator 10 may be any one of electromotive, piezoelectric, electromagnetic, and magnetostrictive actuators.

The actuator 10 is thus small and lightweight, and because the holder 20 can freely rotate around the pivot part in the orthogonal plane when making contact with the body part at two points, i.e., at the contact part 11 of the actuator 10 and the second contact part 22, the actuator 10 is maintained in tight contact with the body part. The listening device is thus comfortable to use.

As a tenth feature, the holder 20 for holding the actuator 10 is made in contact with a human body part at two points, one at the contact part 11 of the actuator 10 and the other at the contact part 22 protruded at a spaced apart location from the contact part 11 of the actuator 10, and the holder 20 is rotated around a shaft in the pivot part between the contact parts 11, 22, the shaft being orthogonal to a plane containing the contact parts 11, 22, and the pivot part.

As an eleventh feature, the holder 20 is pressed against the human body part with a constant pressure, and the holder 20 is retained at a given location.

As a twelfth feature, the actuator 10 may be any one of electromotive, piezoelectric, electromagnetic, and magnetostrictive actuators.

According to these features, the actuator 10 is thus small and lightweight, and because the holder 20 can freely rotate around the pivot part in the orthogonal plane when making contact with the body part at two points, i.e., at the contact part 11 of the actuator 10 and the second contact part 22, the actuator 10 is maintained in tight contact with the body part. The listening device is thus comfortable to use. The holder 20 is biased toward the body part with a constant pressure and retained at a given location. Because the holder 20 can be positioned at any location for the bone conduction and because the contact part 11 of the actuator 10 is pressed against the body part with a constant and appropriate pressure, the level of signal transmission is maintained constant irrespective of the differences in the shape of the body part.

As a thirteenth feature, a listening device includes: a holder 20 including a first contact part 21 for contacting an actuator 10 to a human body part, a second contact part 22 protruded at a spaced apart location from the first contact part 21, and a pivot part 23 between the first and second contact parts 21 and 22; an arm 30 for supporting the holder 20 such as to be rotatable around a shaft in the pivot part orthogonally to a plane containing the first and second contact parts 21, 22, and the pivot part; a support member 41 for rotatably supporting the arm 30 such as to be capable of retaining the arm 30 at any desired location and retracting the arm 30 from the human body part; and a resilient biasing member 31 provided between the arm 30 and the support member 41 so that the holder 20 is pressed against the human body part with a resilient bias applied through the arm 30.

As a fourteenth feature, the actuator 10 may be any one of electromotive, piezoelectric, electromagnetic, and magnetostrictive actuators.

The actuator 10 is thus small and lightweight, and because the holder 20 can freely rotate around the pivot part in the orthogonal plane when making contact with the body part at two points, i.e., at the contact part 11 of the actuator 10 and the second contact part 22, the actuator 10 is maintained in tight contact with the body part. The listening device is thus comfortable to use. The holder 20 is biased toward the body part with a constant pressure and retained at a given location. Because the holder 20 can be positioned at any location for the bone conduction and because the contact part 11 of the actuator 10 is pressed against the body part with a constant and appropriate pressure, the level of signal transmission is maintained constant irrespective of the differences in the shape of the body part.

The present invention thus provides a listening device for a hands-free system with which the caller's voice is not heard by anyone other than the user, and with which the user can hear ambient sounds at the same time.

EXAMPLE

Example of the present invention will be hereinafter described with reference to FIG. 2 to FIG. 5.

The listening device is adapted to an in-vehicle hands-free system and includes, as shown in FIG. 2, an actuator 10, a holder 20 for holding the actuator 10, an arm 30 for supporting the holder 20, and a vehicle seat 40 to which the arm 30 is mounted.

The holder 20 has the following structure:

As shown in FIG. 3, a first contact part 21 and a second contact part 22 are integrally formed at both ends of the holder 20 in a vertically spaced apart relationship, these contact parts protruding toward the center of the seat. The holder 20 thus has a substantially C shape or square C shape when viewed from the front. At least one of these first and second contact parts 21, 22 accommodates the actuator 10 and is larger than the other. In the drawing, the first contact part 21 is larger than the second contact part 22.

The actuator 10 may be anyone of electromotive, piezoelectric, electromagnetic, or magnetostrictive type vibration generators.

The first protruding contact part 21, which is larger than the second contact part 22, includes an accommodating part 24 therein. The actuator 10 for converting voice signals into vibrations is arranged inside the accommodating part 24 such as to be oriented toward the vehicle seat 40. The actuator 10 includes a contact part 11, which protrudes farther than the surface of the holder 20 as shown in FIG. 2 and FIG. 3. In the prior art built-in construction, the actuator would be mounted in the vehicle seat and contacted to a body part indirectly through the seat upholstery. In contrast, the actuator 10 on the holder 20 has the contact part 11 which is directly contacted to a user's head.

The second protruding contact part 22, which is the smaller one, serves as a pressing part; it is pressed against the user's head together with the contact part 11 of the actuator 10 when pressure is applied to the holder 20.

The holder 20 further includes a flange-like pivot part 23 between the first and second contact parts 21, 22. The pivot part 23 is formed integrally in a plane containing the first and second contact parts 21, 22 as shown in FIG. 3. A through hole 25 of a predetermined diameter is formed in the center of the pivot part 23.

The holder 20 is rotatably and detachably supported in a cantilevered fashion at the distal end of the arm 30, which is mounted to the vehicle seat 40.

The arm 30 has the following structure:

The arm 30 has an outer shape which enables the actuator 10 on the holder 20 to be pressed against a relatively hard surface of the head of the user sitting on the vehicle seat 40. As shown in FIG. 2 and FIG. 4, the arm 30 has a substantially linear shape and may slightly be curved toward the center of the seat in accordance with the shape of a headrest 410A or seat back 410B, which serves as a support member 41A, 41B for the arm 30.

As shown in FIG. 3, a support shaft 32 is fitted in the through hole 25 in the pivot part 23 of the holder 20 at the distal end of the arm 30, and retained there with suitable means (not shown) The holder 20 is thus supported in a detachable manner and can be rotated around the support shaft 32, with the actuator 10 and the second contact part 22 facing toward the center of the seat. The holder 20 is inhibited from rotating downward by its self weight around the support shaft 32 more than a preset angle by suitable detent means (not shown).

Therefore, when the holder 20 is contacted to the user's head and pressed by the arm 30, the contact part 11 of the actuator 10 and the second contact part 22 together cause the holder 20 to rotate as required in accordance with the shape or movements of the contact portion of the user's head. Misalignment or lift-up of the actuator 10 is thereby prevented, and the contact part 11 of the actuator 10 is stably maintained in tight contact with the user's head.

The pivotal support of the holder 20 on the arm 30 is achieved with the through hole 25 formed in the pivot part 23 of the holder 20 and the support shaft 32 provided on the arm 30 in the illustrated example, but this structure can obviously be modified in various ways; for example, the pivot part 23 of the holder 20 may be formed with a support shaft and a through hole provided in the arm 30.

At the other end of the arm 30 is provided an arm support shaft 33 as indicated by broken lines in FIG. 2, which extends substantially orthogonally from the end of the arm 30 and is mounted in at least one of the headrest 410A or seat back 410B. The arm 30 is rotatable in back and forth, and left and right, directions within a necessary range by this arm support shaft 33 as indicated by chain double-dashed lines in FIG. 2 and FIG. 4 and can be held in a desired position.

When the listening device is not in use, the arm 30 is rotated away from the user as shown by solid lines in FIG. 4. In this state, the holder 20 is pressed against the side face of the headrest 410A, so that the arm 30 is held stably in position and there is no rattling thereof during the drive.

The necessary rotation angle range of the arm 30 is a range in which the actuator 10 can be pressed against a relatively hard part of the head, which is suitable for the conduction of signals through a bone, except for the external auditory meatus, of the user sitting on the vehicle seat 40.

The mechanism for retaining the arm 30 at a given location within this range may be designed using a ratchet device, but other mechanisms with drive sources such as electric or hydraulic motors can also be employed as long as they are capable of temporarily holding and releasing the arm at a desired angle.

A resilient biasing member 31 or a torsion spring 310 is provided between the arm support shaft 33 and the arm 30 as indicated by broken lines in FIG. 2, so that the holder 20 and the arm 30 are always pressed toward the center of the seat with a constant pressure. (indicated by an arrow P in FIG. 2 and FIG. 3). The pressure P is set such that the arm 30 has an enough reaction force when the holder 20 is pressed against a body part to transmit signals through the bone, but is not so high as to put too much stress on the user's neck. As an alternative, the arm 30 may include a mechanism for changing this pressure in accordance with the differences in the shape of body part or personal likings.

The arm 30 can therefore freely move following the motion of the user. Since the user can move his/her body or head during use, the device is comfortable to use, and because it is pressed against the user's head with a constant pressure, the level of signal transmission is maintained constant.

The vehicle seat 40 has the following structure:

The support member 41 for the arm 30 is part of the vehicle seat 40 which carries the user as shown in FIG. 4; it may be the headrest 410A which supports the back of the user's head in the event of a collision, or the seat back 410B which holds the back of the user. The arm support shaft 33 is attached to one of the headrest 410A or seat back 410B.

A mobile communication terminal or a phone (not shown) is connected to an adaptor which is powered by a cigarette lighter jack or a vehicle power socket. When there is a call, the adaptor makes the phone ring several times. During that time, the user sitting on the vehicle seat 40 rotates the upright arm 30 either manually or automatically, as shown in FIG. 4, so as to press the actuator 10 and the second contact part 22 on the holder 20 against his/her head, preferably a relatively hard part of the head. As the actuator 10 is pressed against the user's head, a reaction force is created in the arm 30, whereby a resilient bias which is necessary for favorable bone conduction of signals is applied to the head. Because the contact part 11 of the actuator 10 and the second contact part 22 can rotate around the support shaft 32 conforming to the shape of the user's head part, the contact part 11 of the actuator 10 makes tight contact with the user's head, as shown in FIG. 5. The vibrations from the actuator 10 are transmitted through the user's skull to the cochlea, whereby the brain interprets them as sound. The user can thus hear the caller's voice clearly. The caller's voice does not leak and cannot be heard by anyone other than the user. The user can also hear ambient sounds as he/she does not wear anything on the ears, so that he/she can perceive the current situation without delay.

The conversation is made through a microphone clipped on the chest, visor, or on some locations on the front pillar. When it ends and the caller hangs up, the phone is cut off automatically. The arm 30 may then be returned to its upright position either manually by the user or automatically, where it remains stably in position because of the holder 20 pressed against the headrest 410A.

The connector cable for connecting the actuator 10 on the holder 20 to the adaptor may be arranged inside the arm 30 and the vehicle seat 40. Alternatively, instead of such connection using a cable, the actuator 10 may be driven by a wireless data transmission system such as short distance radio communication or infrared ray communication.

The microphone may be integrated in the holder 20 or arm 30. In that case the adaptor should preferably include a correction circuit to prevent howling.

According to the present invention, the listening device has the holder 20 for holding the actuator 10, and the holder 20 includes the first contact part 21 for contacting the actuator 10 to a body part, the second contact part 22 protruded at a spaced apart location from the first contact part 21, and the pivot part 23 between the two contact parts 21, 22. The holder 20 is supported such as to be rotatable around a shaft in the pivot part 23 orthogonally to the plane containing the contact parts 21, 22 and the pivot part 23. The holder 20 is supported in the pivot part 23 at the distal end of the arm 30, which is supported at the other end on the support member 41, such that the holder 20 is pressed against the body part with a resilient bias through the arm 30.

Therefore, the actuator 10 on the holder 20 at the distal end of the arm 30 is supported such as to be rotatable around the shaft orthogonally to the plane containing the contact parts 21, 22 and pivot part 23, and is pressed against the body part. This structure enables the holder 20 to be positioned at any location for achieving favorable bone conduction. When the holder 20 is pressed against the body part, the first and second contact parts 21, 22 together cause the holder 20 to rotate as required, so that the contact part 11 of the actuator 10 can make tight contact with the body part. Because it is pressed against the body part with a constant pressure, the level of signal transmission is maintained constant, irrespective of the differences in the shape of the body part. The vibrations from the actuator 10 are transmitted through the user's skull, which the brain interprets as sound. The user can thus hear the caller's voice clearly. The caller's voice does not leak and cannot be heard by anyone other than the user. The user can also hear ambient sounds as he/she does not wear anything on the ears, so that he/she can perceive the current situation without delay.

Although the above embodiment has been described as an in-vehicle hands-free system, the present invention is obviously not limited to such application.

While there has been described what are at present considered to be preferred embodiments of the present invention, it will be understood that various modifications may be made thereto, and it is intended that the appended claims cover all such modifications as fall within the true spirit and scope of the present invention.

What is claimed is:

1. A method of using a listening device equipped on a seat of a vehicle and having an actuator for transmitting a voice signal through a human bone when contacting the actuator to a human body, a holder for holding said actuator, and an arm for supporting said holder at a distal end thereof and being rotatably supported at the other end thereof on a support member, said support member being provided on a part of said vehicle seat, comprising the steps of:

rotating said arm around two axes at a supporting portion of said support member and retaining said arm at any desired location;

contacting said holder for holding said actuator to the human body part at two points, one at a contact part of said actuator and the other at another contact part protruded at a spaced apart location from the contact part of said actuator;

rotating and supporting said holder around a shaft in a pivot part between said contact parts, said shaft being orthogonal to a plane containing said contact parts and said pivot part; and pressing said holder against the human body part with a pressure and retaining said holder at a given location.

2. The method according to claim 1, wherein said actuator is of a type selected from the group consisting of electromotive, piezoelectric, electromagnetic, and magnetostrictive actuators.

3. A listening device equipped on a seat of a vehicle and using an actuator for transmitting a voice signal through a human bone when contacting the actuator to a human body, comprising:

a holder for holding said actuator, said holder including a first contact part for contacting said actuator to a human body part, a second contact part protruded at a spaced apart location from said first contact part and a pivot part between said first contact part and said second contact part, and being supported so as to be rotatable around a shaft in said pivot part orthogonally to a plane containing said first and second contact parts and said pivot part;

an arm for supporting said holder in said pivot part at a distal end thereof and being supported at the other end thereof on a support member such as to be rotatable around two axes and to be capable of retaining said arm at any desired location and retracting said holder from the human body part, said support member being provided to a part of a vehicle seat; and a resilient biasing member provided between said arm and said support member and pressing said holder against the human body part through said arm.

4. The listening device according to claim 3, wherein said holder is detachably supported at the distal end of said arm.

5. The listening device according to claim 3, wherein said actuator is of a type selected from the group consisting of electromotive, piezoelectric, electromagnetic, and magetostrictive actuators.

* * * * *